(No Model.)
W. H. ALLEN.
EXTRACTION APPARATUS.
No. 364,883. Patented June 14, 1887.
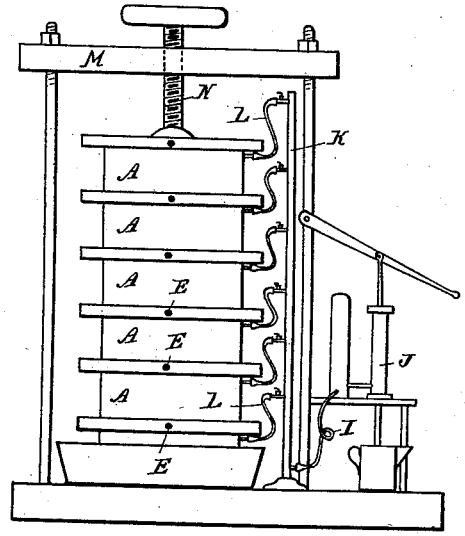
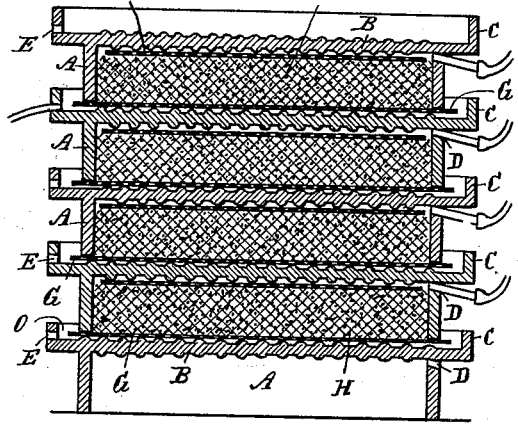
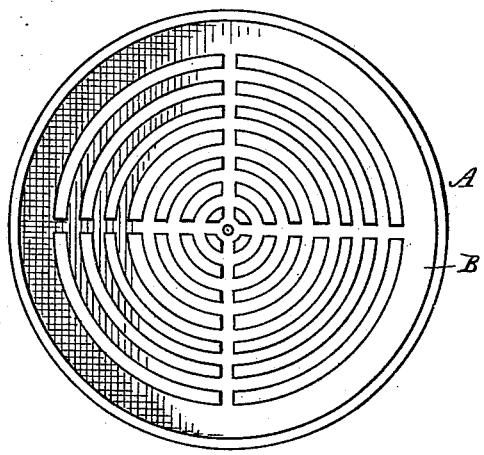
Attest:
John Schuman.
E. Scully.
Inventor:
William H. Allen.
by his Atty

UNITED STATES PATENT OFFICE.

WILLIAM HUMPHRIES ALLEN, OF DETROIT, MICHIGAN.

EXTRACTION APPARATUS.

SPECIFICATION forming part of Letters Patent No. 364,883, dated June 14, 1887.

Application filed August 2, 1886. Serial No. 209,831. (No model.)

*To all whom it may concern:*

Be it known that I, WILLIAM HUMPHRIES ALLEN, of Detroit, in the county of Wayne and State of Michigan, have invented new and useful Improvements in Extraction Apparatus; and I do hereby declare that the following is a full, clear, and exact description thereof, reference being had to the accompanying drawings, which form a part of this specification.

This invention relates to a certain new and useful improvement in apparatus for the manufacture of fluid extracts from solid bodies.

The object of the invention is to construct an apparatus especially adapted for use in laboratories.

The invention consists in the peculiar combinations and the construction, arrangement, and adaptation of parts, all as more fully hereinafter described and claimed.

In the drawings which accompany this specification, Figure 1 is an elevation of my apparatus as arranged for operation. Fig. 2 is an enlarged cross-section through some of the pans. Fig. 3 is a top plan of the pan.

A is a series of like pans or saucers, preferably of cylindrical shape. As shown in the drawings, these pans are used in operation bottom side up and in vertical series. The bottom B of each pan projects outwardly beyond the wall of the pan, and is provided with a standing flange, C. Both sides of the bottom of the pans are provided with grooves or slight projections, and with the lateral openings D E, placed in relation to the bottom of the pan, as shown.

F G are perforated disks, the latter being of somewhat larger diameter than the former.

H is the drug or solid body to be extracted.

I is the discharge-pipe of a force-pump, J.

K is the main delivery-pipe, and L are the branch pipes for introducing the solvent into each pan.

M is a frame arranged to hold the pans in vertical position, and is provided with a suitable screw, N, or equivalent device for clamping the pans together.

In practice the body which it is desired to extract is previously ground and preferably put in the form of a paste. Each pan before filling has one of the perforated disks, F, laid over its bottom, and in constructing the pile the pans are reversed and one of the larger perforated disks, G, is laid between each pan and the next succeeding one. After the pans are clamped together and the pipe-connections made, the proper solvent (at the desired temperature) is then forced by means of the force-pump into the individal pans, taking its course evenly through the entire mass contained therein and finding its way out into the channels O, formed between the flanges C and the sides of the pans, may be allowed to trickle down the sides into a vessel placed underneath, or be conducted off separately from each pan through a suitable trough fixed in the openings E.

The grooves or projections formed on both the upper and lower faces of the bottom of the pans are for the purpose of permitting the solvent to flow freely into and out of the mass, and it is obvious that the same object may be obtained by providing the perforated disks with suitable projections or studs to hold them out of too close contact with the faces of the bottom of the pans.

With an apparatus of this kind the solid body may be used in a finely-divided state without fear of choking the solvent in its course through it and without using an inordinate amount of solvent, which is the great disadvantage in preparing such fluid extracts at present. Thus the apparatus is expeditious and economical in its use of solvent, as well as by the completeness with which the solvent matter is extracted. If the extraction is not completed at one operation, it may be repeated as often as desired to gain all the soluble matter wanted.

An additional advantage is gained in the almost complete recovery of the solvent absorbed by the mass, it being a simple procedure to displace it by washing the mass in the same manner after obtaining the extract.

As my apparatus can be used just as advantageously with larger as with a smaller number of pans, and as it is readily cleaned and put into use, its general practicability and application for laboratory use will readily appear.

What I claim as my invention is—

1. In an extractor, a pan, A, provided with an enlarged bottom provided upon opposite sides with projections or grooves, and a standing flange provided with lateral opening E above said grooves, and a lateral opening, D, upon the opposite side of said bottom, substantially as described.

2. In an extractor, a plurality of pans provided with corrugated bottom and standing flange, arranged in vertical series in an inverted position, combined with the perforated disk F and larger perforated disk, G, arranged upon opposite sides of said bottom, and operating substantially as and for the purpose specified.

3. In a device for the purpose described, a plurality of independent pans arranged in vertical series in an inverted position, each pan provided with a bottom corrugated upon opposite sides, and a standing flange, C, leaving a channel, O, between each flange and the side of the next higher pan, combined with an independent connection between each pan and a force-pump, substantially as and for the purpose specified.

WILLIAM HUMPHRIES ALLEN.

Witnesses:
ANDREW HAIR,
W. H. JONES.